United States Patent
Littlejohn et al.

(10) Patent No.: US 6,355,929 B1
(45) Date of Patent: Mar. 12, 2002

(54) METHOD FOR FORMING A SEAT IN A PULSED SAMPLING VALVE

(75) Inventors: Duane P. Littlejohn; W. Peter Schubert, both of Manlius, NY (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/173,889

(22) Filed: Oct. 16, 1998

(51) Int. Cl.[7] .......................... B01D 59/44; H01J 49/00
(52) U.S. Cl. ............................................. 250/288
(58) Field of Search .............................. 250/288, 291, 250/281, 283; 431/25; 209/558

(56) References Cited

U.S. PATENT DOCUMENTS

| | | | |
|---|---|---|---|
| 3,895,231 A | 7/1975 | Sodal et al. ................. | 250/288 |
| 3,937,955 A | 2/1976 | Comisarow et al. ......... | 250/283 |
| 4,560,871 A | * 12/1985 | Bowman et al. ............. | 250/288 |
| 5,313,061 A | 5/1994 | Drew et al. .................. | 250/281 |
| 6,121,609 A | * 9/2000 | Littlejohn ..................... | 250/288 |

* cited by examiner

*Primary Examiner*—Jack Berman
*Assistant Examiner*—Johnnie L. Smith, II

(57) ABSTRACT

A method for forming the seat in a pulsed sampling valve used in a FTICR MS. The valve has a ceramic ball that closes against the seat to thereby seal the passageway that is used for introduction of sample into the FTICR MS vacuum chamber. The material from which the seat is formed is chosen to withstand relatively high operating temperatures and a precise deburred hole is drilled in that material. The pre-load spring exerts a force against the ball when the valve is assembled. The force initially exceeds the yield strength of the seat material to deform the material to form the seat.

11 Claims, 3 Drawing Sheets

METHOD FOR FORMING A SEAT IN A PULSED SAMPLING VALVE

FIELD OF THE INVENTION

This invention relates to a mass spectrometer (MS) which uses the Fourier transform ion cyclotron resonance (FTICR) technique to determine the mass of ions and more particularly to a method for forming the sealing seat in the sampling valve in the FTICR MS which is used to admit sample to the high vacuum environment of the FTICR MS.

DESCRIPTION OF THE PRIOR ART

When a gas phase ion at low pressure is subjected to a uniform static magnetic field, the resulting behavior of the ion is determined by the magnitude and orientation of the ion velocity with respect to the magnetic field. If the ion is at rest, or if the ion has only a velocity parallel to the applied field, the ion experiences no interaction with the field.

If there is a component of the ion velocity that is perpendicular to the applied field, the ion will experience a force that is perpendicular to both the velocity component and the applied field. This force results in a circular ion trajectory that is referred to as ion cyclotron motion. In the absence of any other forces on the ion, the angular frequency of this motion is a simple function of the ion charge, the ion mass, and the magnetic field strength:

$$\omega = qB/m \quad \text{Eq. 1}$$

where: $\omega$=angular frequency (radians/second)

q=ion charge (coulombs)

B=magnetic field strength (tesla)

M=ion mass (kilograms)

The FTICR MS exploits the fundamental relationship described in Equation 1 to determine the mass of ions by inducing large amplitude cyclotron motion and then determining the frequency of the motion. The first use of the Fourier transform in an ion cyclotron resonance mass spectrometer is described in U.S. Pat. No. 3,937,955 entitled "Fourier Transform Ion Cyclotron Resonance Spectroscopy Method And Apparatus" issued to M. B. Comisarow and A. G. Marshall on Feb. 10, 1976.

The ions to be analyzed are first introduced to the magnetic field with minimal perpendicular (radial) velocity and dispersion. The cyclotron motion induced by the magnetic field effects radial confinement of the ions; however, ion movement parallel to the axis of the field must be constrained by a pair of "trapping" electrodes. These electrodes typically consist of a pair of parallel-plates oriented perpendicular to the magnetic axis and disposed on opposite ends of the axial dimension of initial ion population. These trapping electrodes are maintained at a potential that is of the same sign as the charge of the ions and of sufficient magnitude to effect axial confinement of the ions between the electrode pair.

The trapped ions are then exposed to an electric field that is perpendicular to the magnetic field and oscillates at the cyclotron frequency of the ions to be analyzed. Such a field is typically created by applying appropriate differential potentials to a second pair of parallel-plate "excite" electrodes oriented parallel to the magnetic axis and disposed on opposing sides of the radial dimension of the initial ion population.

If ions of more than one mass are to be analyzed, the frequency of the oscillating field may be swept over an appropriate range, or be comprised of an appropriate mix of individual frequency components. When the frequency of the oscillating field matches the cyclotron frequency for a given ion mass, all of the ions of that mass will experience resonant acceleration by the electric field and the radius of their cyclotron motion will increase.

An important feature of this resonant acceleration is that the initial radial dispersion of the ions is essentially unchanged. The excited ions will remain grouped together on the circumference of the new cyclotron orbit, and to the extent that the dispersion is small relative to the new cyclotron radius, their motion will be mutually in phase or coherent. If the initial ion population consisted of ions of more than one mass, the acceleration process will result in a multiple isomass ion bundles, each orbiting at its respective cyclotron frequency.

The acceleration is continued until the radius of the cyclotron orbit brings the ions near enough to one or more detection electrodes to result in a detectable image charge being induced on the electrodes. Typically these "detect" electrodes will consist of a third pair of parallel-plate electrodes disposed on opposing sides of the radial dimension of the initial ion population and oriented perpendicular to both the excite and trap electrodes. Thus the three pairs of parallel-plate electrodes employed for ion trapping, excitation, and detection are mutually perpendicular and together form a closed box-like structure referred to as a trapped ion cell. FIG. 1 shows a simplified diagram for a trapped ion cell 12 having trap electrodes 12a and 12b; excite electrodes 12c and 12d; and detect electrodes 12e and 12f.

As the coherent cyclotron motion within the cell causes each isomass bundle of ions to alternately approach and recede from a detection electrode 12e, 12f, the image charge on the detection electrode correspondingly increases and decreases. If the detection electrodes 12e, 12f are made part of an external amplifier circuit (not shown), the alternating image charge will result in a sinusoidal current flow in the external circuit. The amplitude of the current is proportional to the total charge of the orbiting ion bundle and is thus indicative of the number of ions present. This current is amplified and digitized, and the frequency data is extracted by means of the Fourier transform. Finally, the resulting frequency spectrum is converted to a mass spectrum using the relationship in Equation 1.

Referring now to FIG. 2, there is shown a general implementation of a FTICR MS 10. The FTICR MS 10 consists of seven major subsystems necessary to perform the analytical sequence described above. The trapped ion cell 12 is contained within a vacuum system 14 comprised of a chamber 14a evacuated by an appropriate pumping device 14b. The chamber is situated within a magnet structure 16 that imposes a homogeneous static magnetic field over the dimension of the trapped ion cell 12. While magnet structure 16 is shown in FIG. 2 as a permanent magnet, a superconducting magnet may also be used to provide the magnetic field.

Pumping device 14b may be an ion pump which is an integral part of the vacuum chamber 14a. Such an ion pump then uses the same magnetic field from magnet structure 16 as is used by the trapped ion cell 12. An advantage of using an integral ion pump for pumping device 14b is that the integral ion pump eliminates the need for vacuum flanges that add significantly to the volume of gas that must be pumped and to the weight and cost of the FTICR MS. One example of a mass spectrometer having an integral ion pump is described in U.S. Pat. No. 5,313,061.

The sample to be analyzed is admitted to the vacuum chamber 14a by a sample introduction system 18 that may, for example, consist of a leak valve or gas chromatograph column. The sample molecules are converted to charged species within the trapped ion cell 12 by means of an ionizer 20 which typically consists of a gated electron beam passing through the cell 12, but may consist of a photon source or other means of ionization. Alternatively, the sample molecules may be created external to the vacuum chamber 14a by any one of many different techniques, and then injected along the magnetic field axis into the chamber 14a and trapped ion cell 12.

The various electronic circuits necessary to effect the trapped ion cell events described above are contained within an electronics package 22 which is controlled by a computer based data system 24. This data system 24 is also employed to perform reduction, manipulation, display, and communication of the acquired signal data.

The FTICR MS 10 needs an ultra high vacuum to operate. The sensitivity of the FTICR MS 10 is such that an extremely small amount of the sample is required for a complete analysis. As was described above, the sample introduction system may consist of a leak valve. One example of such a valve is disclosed in U.S. Pat. No. 3,895,231 ("the '231 Patent") which issued on Jul. 15, 1975. The valve of the '231 Patent includes a diamond tipped or steel needle that closes the gas flow path. Another example of such a valve is shown in U.S. Pat. No. 4,560,871. The valve shown therein has a ball that closes the gas flow path.

As is well known to those in the art, the higher the temperature that a MS operates at the greater the range of the MS as the higher operating temperature gives rise to a greater range of gas phase molecules that can be analyzed in the MS. The operating temperature of the MS is limited by the materials used in the gas flow path.

Further the FTICR MS is a pulsed device and thus requires a sample volume at least 1000 times smaller than conventional mass spectrometers. High vacuum pumps required to reach the extremely low pressure needed by the FTICR MS can be very expensive. The cost is proportional to the volume and pressure of the sample gas to be pumped. Therefore, the FTICR MS requires a valve for operation at low leak rates that must have long life and virtually perfect seals. The present invention allows such a seal to be made such that the valve has undetectable leak rates and lifetimes in excess of one billion cycles of operation.

SUMMARY OF THE INVENTION

The present invention is a method for forming a seat in a pulsed sampling valve. The method includes the step of providing a seat support structure that has a passageway therein for admitting gas sample into a mass spectrometer vacuum chamber when the valve is opened. The method also includes the step of drilling a hole in the support structure. The drilled hole communicates with the passageway. The method further includes the step of aligning a ball with the support structure passageway central axis. The method further also includes the step of exerting a force to bring the ball in contact with the edges of the hole. The force initially exceeds the yield strength of the material from which the edges are formed. The edges deform in response to the force exerted through the ball until the area of contact between the edges and the ball increases to stop the deformation.

The present invention is a mass spectrometer that includes a vacuum chamber and a pulsed sampling valve that has a passageway for allowing gas sample to enter the vacuum chamber when the valve is opened. The valve has a seat formed by a method that includes the step of providing a seat support structure that has the passageway. The method further includes the step of drilling a hole in the support structure. The drilled hole communicates with the passageway. The method also includes the step of aligning a ball with the support structure passageway central axis. The method also further includes the step of exerting a force to bring the ball in contact with the edges of the hole. The force initially exceeds the yield strength of the material from which the edges are formed. The edges deform in response to the force exerted through the ball until the area of contact between the edges increases to stop the deformation.

The present is a method for forming a seat in a pulsed sampling valve. The method has the step of providing a precision seat comprising a ceramic ball and a ceramic seat support structure having a ceramic seat where the ball meets said support structure. The structure has a hole which is closed when the ball meets the support structure and a passageway therein. The hole communicates with the passageway. The passageway is for admitting gas sample into a mass spectrometer vacuum chamber when the valve is opened. The method also includes the step of coating the ceramic seat with one or more layers of a metal that will yield when a force is applied to the ball. The method further includes the step of exerting a force to bring the ball in contact with the edges of the metal coated ceramic seat. The force initially exceeds the yield strength of the metal. The metal coated seat edges deforms in response to the force exerted through the ball until the area of contact between the metal and the ball increases to stop the deformation.

DESCRIPTION OF THE PREFERRED EMBODIMENT(S)

Figure 1:
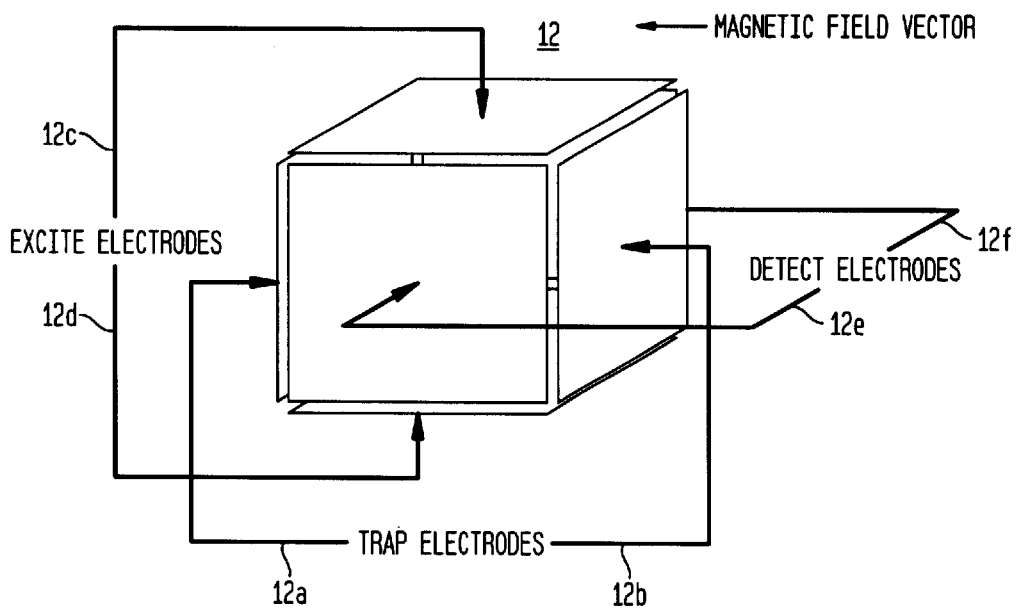
FIG. 1 shows a simplified diagram for a trapped ion cell.
Figure 2:
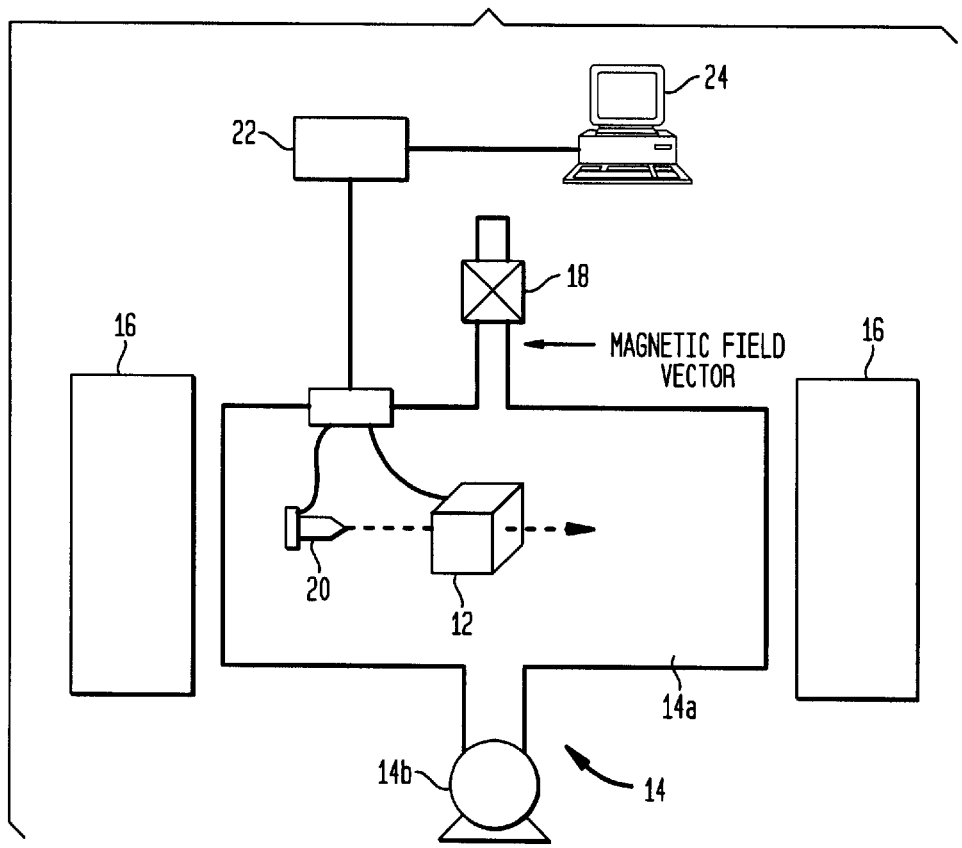
FIG. 2 shows a block diagram of a typical FTICR MS.
Figure 3:
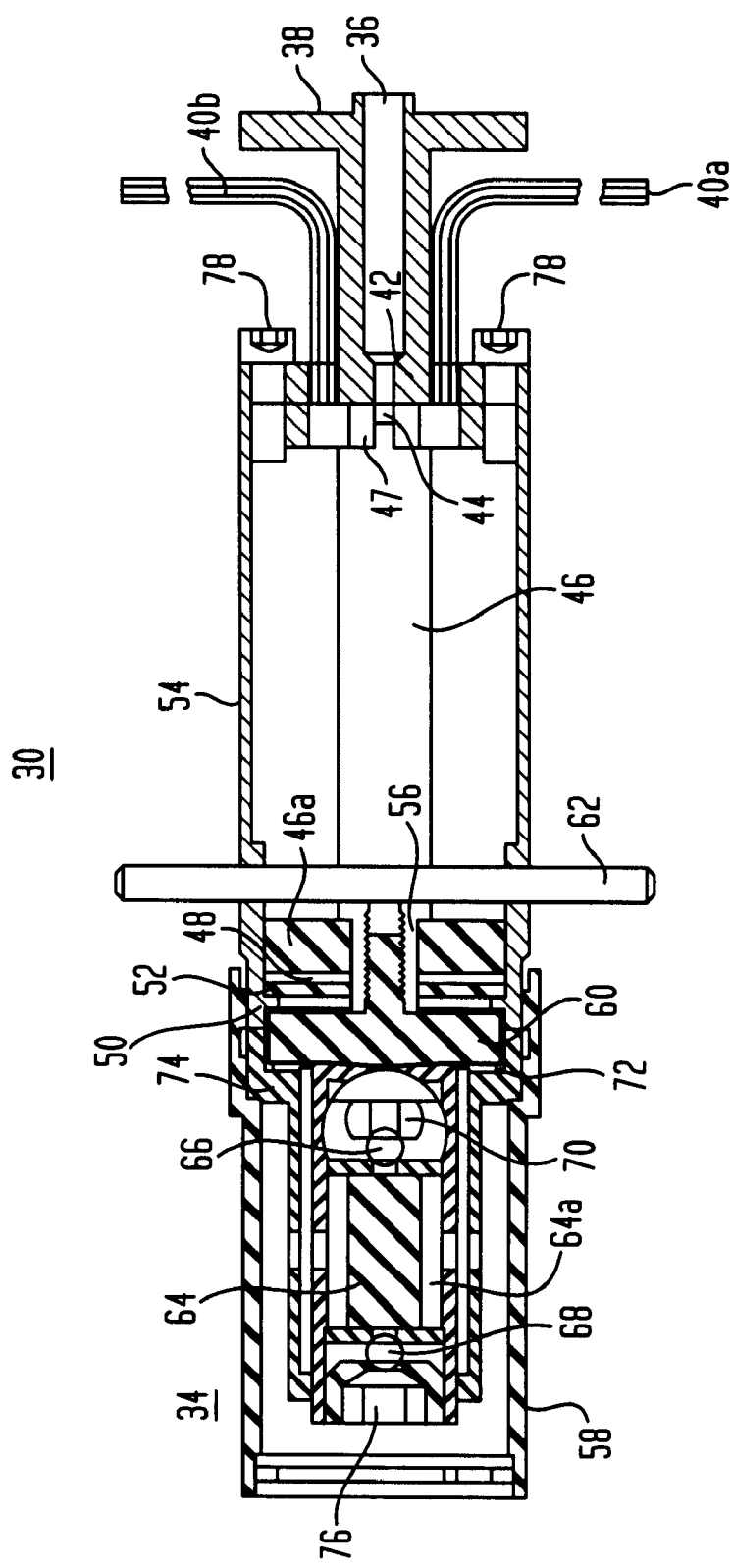
FIG. 3 shows a partial cross section through a leak valve.

Referring now to FIG. 3, there is shown a partial cross section of a valve 30 which includes a seat formed as will be described below in accordance with the method of the present invention. Valve 30 is the combination of valve subassembly 32 and actuator subassembly 34. Valve 30 includes in valve subassembly 32 a passageway 36 for introduction of the sample into the vacuum chamber of the FTICR MS. Valve 30 further includes in valve subassembly 32 a valve seat support structure 38 which defines passageway 36. Passageway 36 is in fluid contact with first and second sample tubes 40a, 40b by way of the seat 42 and ball 44.

The top portion of passageway 36 has an opening or valve seat 42 which is formed in valve seat support structure 38. The valve seat 42 is selectively closed and opened by closure component 44 which as is shown in FIG. 3 is in the form of a ceramic ball or sphere. The valve subassembly 32 further includes valve plunger 46 one end of which is in interference fit with ball 44. Plunger 46 and closure component 44 are both co-axially aligned with the central axis of passageway 36.

The valve subassembly 32 also further includes a spring 48 which provides a pre-load to thereby cause ball 44 to form the valve seat 42 in the manner to be described below and to maintain the vacuum seal when valve 30 is assembled. When valve 30 is assembled, pre-load spring 48 is held in place between a flange 46a on plunger 46 and a retaining ring 50. A spring spacer 52 is between pre-load spring 48 and retaining ring 50. All of the parts of valve subassembly 32 are contained in valve body 54.

As can be seen from FIG. 3, the end of plunger 42 adjacent flange 46a has therein threads 56 as does the outer edge of valve body 54 adjacent actuator subassembly 34. Actuator subassembly 34 has a cover 58 which has threads complementary to those in the outer edge of valve body 54 and a plunger driver 60 which has threads complementary to the threads in the plunger 42. When valve 30 is assembled, the actuator subassembly 34 is brought into contact with valve subassembly 32 in a manner such that the threads on cover 58 mate with the threads on valve body 54 and the threads on plunger driver 60 mate with the complementary threads in plunger 46. The subassembly 34 is then screwed onto subassembly 32. Valve 30 further includes a pin 62 which is held in a vise when subassembly 34 is screwed onto subassembly 32 to thereby keep ball 44 from rotating in seat 42 during the assembly operation. Pin 62 is removed once the assembly of valve 30 is completed.

In addition to plunger driver 60, actuator device 34 also includes a piezoelectric actuator 64 one end of which is in contact with a ball 66 and the other end of which is in contact with a ball 68. Ball 66 is in contact with one end of an actuator bridge pin 70. The other end of pin 70 is in contact with piezoelectric return spring 72. Spring 72 is captured between plunger driver 60 and actuator base 74.

Actuator 64 and balls 66 and 68 are captured in cylindrical cavity 60a of plunger driver 60. The end of cavity 60a opposite spring 72 is closed by pre-load screw 76. The pre-load screw 76 functions to adjust the space between actuator 64 and balls 66 and 68. Actuator cover 58 encloses actuator 64, balls 66 and 68, actuator bridge pin 70, spring 72, actuator base 74 and pre-load screw 76. Cover 58 is enclosed at its open end by a suitable closing means.

As is well known, when piezoelectric actuator 64 is energized by an electrical signal (the leads connecting the signal to actuator 64 have been omitted in FIG. 3), the actuator is actuated to increase in length thereby drawing plunger driver 60 towards pre-load screw 76. Since driver 60 is connected to valve plunger 46, the movement of driver 60 towards screw 76 causes valve plunger 46 to also move towards the screw. Ball 44 is interference fit in membrane structure 47 and to plunger 46 and therefore the ball moves towards the screw 76 thereby providing an opening to passageway 36 for gas sample to enter passageway 36 to the FTICR MS vacuum chamber 14a.

Upon the end of the electrical signal, the pre-load spring 48 and spring 72 acting together cause the piezoelectric actuator 64 and therefore the plunger driver 60 and valve plunger 46 and thus ball 44 to return to the position those elements had before the actuator 64 received the electrical signal. Therefore, upon the end of the electrical signal the ball 44 will return to valve seat 42 to thereby close passageway 36.

The method by seat 42 is formed will now be described. Prior to assembly of valve subassembly 32, a precise hole is drilled in valve seat support structure 38. In order to drill a precise hole it is necessary to avoid the wobble that is present if a standard drill bit is used to drill the hole. In one implementation for valve 30, the technique used to drill the hole was single point machining.

The hole drilled in valve seat support structure 38 should have sharp edges. As is well known, even the single point machining technique will give rise to burr(s). In that same one implementation for valve 30, electro-polishing is used to remove any burr(s) arising from the single point machining technique. Also in that same implementation for valve 30, structure 38 is annealed subsequent to drilling the hole so that its yield strength is at the lowest possible level.

Valve subassembly 32 is now assembled. As was previously described, ball 44 is an interference fit in membrane structure 47 and to plunger 46. Flange 46a of plunger 46 is then brought into contact with pre-load spring 48 which pre-loads the ball 44 and plunger 46. The open end of valve subassembly 32 is closed by support structure 38 which is held in place by screws 78.

Pre-load spring 48 exerts a force in pounds per square inch which initially exceeds the yield strength of the edges of the hole drilled in support structure 38 since the area of contact between the ball 44 and the edges of the hole is so small. The yield strength of the edges depends on the material used for structure 38 and processing, if any, of structure 38 to reduce the yield strength.

Since it is desired to use the valve of the present invention in a FTICR MS which is designed to operate at temperatures up to 300° C., the material used for support structure 38 must meet the foregoing operating temperature requirements and must also have homogeneity to limit foreign inclusions in the structure 38. Materials that meet these requirements are limited to non-corrosive metals that have a high purity. In the one implementation for valve 30, a high purity, 316 stainless steel produced by Carpenter Steel was chosen for support structure 38. Another implementation uses a precision ceramic seat, that is, the ball 44 and support structure 38 are both ceramic, coated with several metal layers to provide a surface that will yield in a manner similar to that described below.

Since the force in pounds per square inch initially exceeds the yield strength of the drilled hole edges in support structure 38 the hole edges deform. As the edges deform the area of contact between the ball and the hole edges increases to the point where the pounds of force divided by the contact area is exactly equal to the yield strength of the material used for support structure 38. Thus, a perfect seat 42 is formed and ball 44 always makes a perfect seal with the opening to passageway 36.

Figure 4:
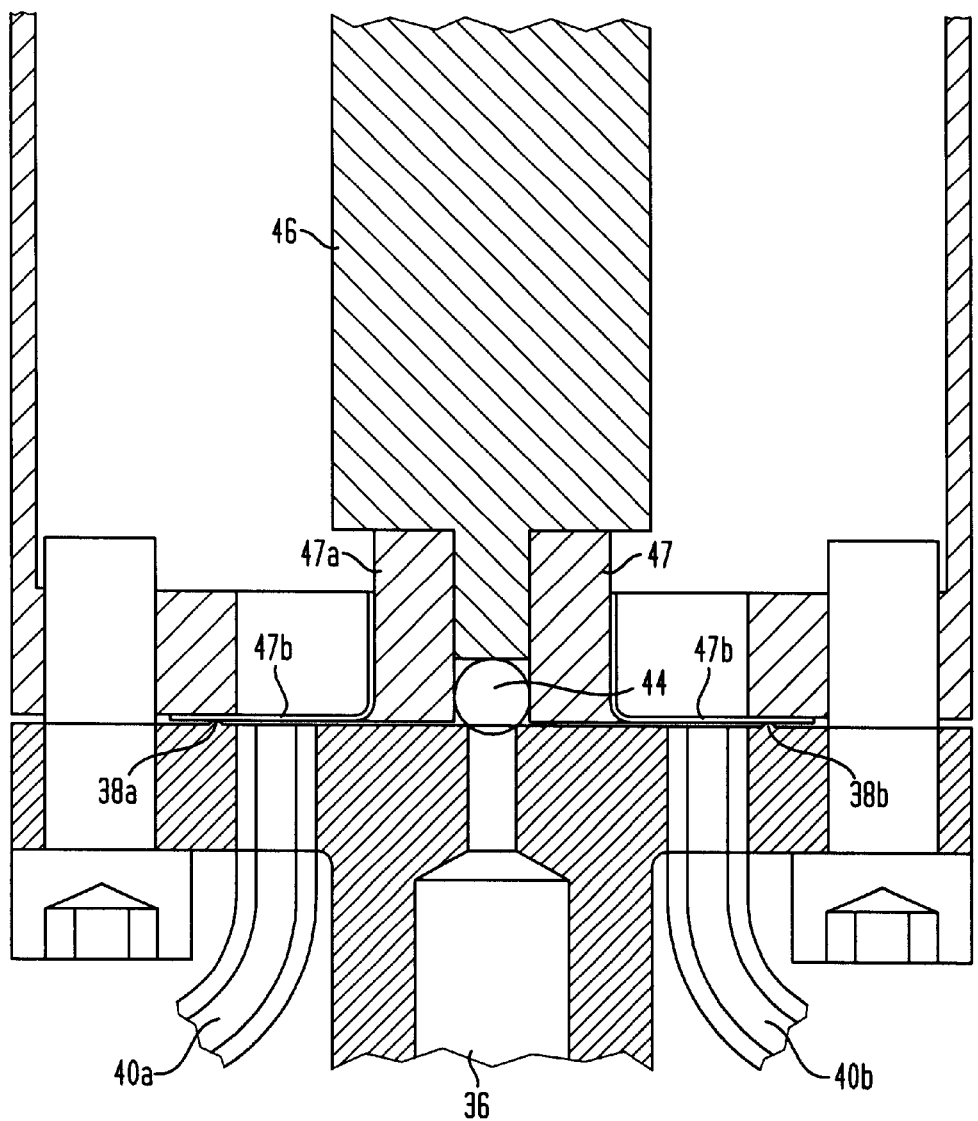
FIG. 4 shows an enlargement of a part of the valve of FIG. 3 adjacent the ceramic ball.

Referring now to FIG. 4, there is shown an enlargement of that part of support structure 38 that is adjacent ball 44 in FIG. 3. As can be seen from FIG. 4, the support structure 38 includes a circular sealing bead 38a. Membrane structure 47 consists of a cylindrical hub 47a and a thin circular membrane 47b that extends to the sealing bead 38a. Ball 44 is pressed into a central opening in hub 47a from one direction and the plunger 46 is pressed into the hub 47a from the opposite direction.

Since membrane 47b is stiff in the lateral direction the bead 38a should not contact membrane 47b until after seat 42 is fully formed. This ensures that the ball 44 will find its own center without any lateral constraint. Once the seat 42 is formed, support structure 38 is forced into contact with valve body 54 and secured by retaining screws 78 capturing the membrane 47b with sealing bead 38a. The stiffness of membranes 47b in the lateral direction ensures that any motion between the ball 44 and seat 42 after the seat is fully formed is axial and not in the lateral direction. The axial motion only ensures that the ball 44 returns to perfect seat 42. Further, membrane 47b and sealing bead 38a together form a gas tight seal which allows the transfer of sample from one vacuum system to another vacuum system.

It should be appreciated that the perfect seat 42 formed using the method of the present invention forms a perfect vacuum seal. In the case of power failure the vacuum chamber 14a is closed and high vacuum is maintained even in the absence of power. To restart the FTICR MS, it is only required that power be restored. Full operation is then immediate upon the restoration of power. The combination of the perfect vacuum seal provided by valve 30 and the integral ion pump 14b allows long time storage of the FTICR MS without power.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for forming a seat in a pulsed sampling valve comprising the steps of:
   a. providing a seat support structure that has a passageway therein for admitting gas sample into a mass spectrometer vacuum chamber when said valve is opened;
   b. drilling a hole in said support structure, said drilled hole communicating with said passageway;
   c. aligning a ball with said support structure passageway central axis; and
   d. exerting a force to bring said ball in contact with the edges of said hole, said force initially exceeding the yield strength of the material from which said edges are formed, said edges deforming in response to said force exerted through said ball until the area of contact between said edges and said ball increases to stop said deformation.

2. The method of claim 1 wherein said hole drilling is performed using single point machining.

3. The method of claim 1 wherein said hole is electro-polished after drilling to remove any burrs.

4. The method of claim 1 wherein said step of hole drilling comprises the steps:
   a. single point machining to drill said hole; and
   b. electro-polishing said hole after drilling to remove any burrs therein.

5. The method of claim 1 wherein said support structure is annealed subsequent to said drilling to reduce the yield strength of said support structure.

6. The method of claim 1 wherein said support structure is constructed of a material that is capable of withstanding temperatures of up to 300° C. and has homogeneity.

7. The method of claim 6 wherein said support structure material is a non-corrosive metal having a high purity.

8. The method of claim 1 wherein said ball is ceramic.

9. A mass spectrometer comprising:
   a. a vacuum chamber situated within said mass spectrometer;
   b. a pulsed sampling valve coupled to said vacuum chamber and having a passageway for allowing gas sample to enter said vacuum chamber when said valve is opened and a seat formed by a method comprising the steps of:
      i. providing a seat support structure with said passageway therein;
      ii. drilling a hole in said support structure, said drilled hole communicating with said passageway;
      iii. aligning a ball with said support structure passageway central axis; and
      iv. exerting a force to bring said ball in contact with the edges of said hole, said force initially exceeding the yield strength of the material from which said edges are formed, said edges deforming in response to said force exerted through said ball until the area of contact between said edges increases to stop said deformation.

10. The mass spectrometer of claim 9 further comprising an ion pump integral with said vacuum chamber.

11. A method for forming a seat in a pulsed sampling valve comprising the steps of:
   a. providing a precision seat comprising a ceramic ball and a ceramic seat support structure having a ceramic seat where said ball meets said support structure, said structure having a hole which is closed when said ball meets said support structure and a passageway therein, said hole communicating with said passageway and said passageway for admitting gas sample into a mass spectrometer vacuum chamber when said valve is opened;
   b. coating said ceramic seat with one or more layers of a metal that will yield when a force is applied to said ball; and
   c. exerting a force to bring said ball in contact with the edges of said metal coated ceramic seat, said force initially exceeding the yield strength of said metal, said metal coated seat edges deforming in response to said force exerted through said ball until the area of contact between said metal and said ball increases to stop said deformation, thereby forming said seat in the pulsed sampling valve.

* * * * *